(12) United States Patent
Ogawa et al.

(10) Patent No.: US 7,150,893 B1
(45) Date of Patent: Dec. 19, 2006

(54) MILK BEVERAGE

(75) Inventors: Akihiro Ogawa, Yokohama (JP); Toshiya Katsuragi, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/532,024

(22) Filed: Mar. 21, 2000

(30) Foreign Application Priority Data

Mar. 24, 1999 (JP) ................. 11-079346

(51) Int. Cl.
*A23C 9/00* (2006.01)

(52) U.S. Cl. ................. 426/580; 426/583; 426/585; 426/654

(58) Field of Classification Search ................. 426/580, 426/583, 584, 585, 586, 654, 602, 604, 611
See application file for complete search history.

(56) References Cited

U.S. PATENT DOCUMENTS

| | | | | |
|---|---|---|---|---|
| 3,637,774 | A | * | 1/1972 | Babayan ................. 260/410.6 |
| 3,968,169 | A | * | 7/1976 | Seiden et al. ........... 260/615 R |
| 4,093,750 | A | * | 6/1978 | Babayan ................. 426/250 |
| 4,419,378 | A | * | 12/1983 | Rule ..................... 426/592 |
| 4,960,602 | A | * | 10/1990 | Talkington et al. ......... 426/534 |
| 5,882,708 | A | * | 3/1999 | Takahashi et al. ....... 426/330.3 |
| 6,156,807 | A | * | 12/2000 | Kaitou et al. .................. 516/70 |
| 6,235,335 | B1 | * | 5/2001 | Sekula et al. ............... 426/585 |

FOREIGN PATENT DOCUMENTS

| | | |
|---|---|---|
| EP | 0236288 * | 9/1987 |
| JP | 59-95847 | 6/1984 |
| JP | 61-242567 | 10/1986 |
| JP | 62-115266 | 5/1987 |
| JP | 62-215345 | 9/1987 |
| JP | 63-79579 | 4/1988 |
| JP | 63-102659 | 5/1988 |
| JP | 63-105640 | 5/1988 |
| JP | 2-261366 | 10/1990 |
| JP | 3-83543 | 4/1991 |
| JP | 3-175932 | 7/1991 |
| JP | 3-266939 | 11/1991 |
| JP | 06-038682 | 2/1994 |
| JP | 6-121640 | 5/1994 |
| JP | 6062734 | 8/1994 |
| JP | 6-253735 | 9/1994 |
| JP | 07-145104 | 6/1995 |
| JP | 08-205771 | 8/1996 |
| JP | 8-252080 | 10/1996 |
| JP | 10-42801 | 2/1998 |
| JP | 10295347 | 10/1998 |
| JP | 11-075684 | 3/1999 |
| JP | 11075683 | 3/1999 |
| JP | 11075684 | 3/1999 |
| JP | 11075685 | 3/1999 |

OTHER PUBLICATIONS

Katsuragi et al Foods Food Ingredients J. Jpn. No. 180 (1999) p. 35-44 Polyglycerol Fatty Acid Esters: Effects of Structure and Composition on Functions p. 38, right col., lines 2-21.

* cited by examiner

*Primary Examiner*—Leslie Wong
(74) *Attorney, Agent, or Firm*—Nixon & Vanderhye P.C.

(57) ABSTRACT

A milk beverage of the present invention comprises a polyglycerol fatty acid ester having a cloud point of not less than 90° C. when measured at a concentration of 1% by weight in a 20% sodium chloride aqueous solution containing said ester.

7 Claims, No Drawings

MILK BEVERAGE

BACKGROUND OF THE INVENTION

The present invention relates to a milk beverage, and more particularly, to a milk beverage which is excellent in emulsion-thermal stability and long-term keeping stability even when the beverage is subjected to UHT sterilization ordinarily used for PET bottle-filled beverages.

Milk beverages containing milk components, such as milk coffee, have been subjected to heat sterilization treatment upon the production thereof for subsequent storage. In order to prevent deterioration or putrefaction of these milk beverages due to growth of surviving thermophilic spore bacteria having a heat resistance, it is widely known to add sucrose fatty esters thereto. There have also been proposed methods of using polyglycerol fatty acid ester in combination with sucrose fatty acid ester in order to prevent liberated fats or coagulated proteins from being produced during storage of milk beverages, and to maintain a good emulsion stability of the milk beverages for a long period of time (Japanese Patent Application Laid-Open (KOKAI) Nos. 61-2426567(1986) and 62-215345, etc.). These methods are very effective to maintain the emulsion stability of milk beverages.

The above conventional methods are applicable to retort-sterilized milk beverages without problem, but do not have sufficient effects on milk beverages which are subjected to UHT (ultra high temperature) sterilization recently used for PET bottle-filled beverages. This is because when being subjected to UHT sterilization, milk proteins contained in the milk beverages are thermally denatured and tend to be precipitated, resulting in deterioration in keeping property thereof. To solve this problem, there has been further proposed the method of minimizing the UHT sterilization time and adding polysaccharides as a thickener such as pectin or carrageenan to the milk beverages. However, this method is still insufficient to allow the UHT-sterilized milk beverages to maintain its keeping stability for a long period of time.

As a result of the present inventors' earnest studies, it has been found that a milk beverage containing a polyglycerol fatty acid ester having a specific cloud point exhibit a good emulsion stability for a long period of time even when being subjected to UHT sterilization. The present invention has been attained on the basis of the finding.

SUMMARY OF THE INVENTION

It is an object of the present invention to provide a milk beverage capable of maintaining an emulsion stability for a long period of time even when being subjected to UHT sterilization.

In a first aspect of the present invention, there is provided a milk beverage comprising a polyglycerol fatty acid ester having a cloud point of not less than 90° C. when measured in a 20% sodium chloride aqueous solution containing the said ester at a concentration of 1% by weight.

In a second aspect of the present invention, there is provided a milk beverage comprising a sucrose fatty acid ester in addition to the said polyglycerol fatty acid ester.

DETAILED DESCRIPTION OF THE INVENTION

The milk beverage according to the present invention includes those beverages containing milk fats and milk proteins as milk components. Specific examples of the milk beverages may include whole milk powder solutions, milk coffee, milk tea or the like.

As the milk components of the milk beverages, there may be exemplified milk (cow's milk), whole milk powder, skimed milk powder, fresh cream or the like. The milk components in the milk beverage may be prepared by adding milk proteins such as non-fat milk powder and milk fats such as butter or milk oil, individually. The content of the milk components is usually 5 to 60% by weight, preferably 10 to 25% by weight (calculated as milk) based on the total weight of the milk beverage. The milk beverage is preferably neutral or weakly acidic, i.e., has a pH of preferably 5.5 to 7.0. Further, the milk beverage may contain known additives such as sugar, perfumes, vitamins or the like.

The polyglycerol fatty acid ester contained in the milk beverage of the present invention is in the form of a mixture composed of an ester obtained by reacting polyglycerol with fatty acid, and unreacted polyglycerol. Properties of the mixture vary depending upon degree of polymerization of polyglycerol, kind of fatty acid, esterification percentage of fatty acid (amount of unreacted polyglycerol), proportions of esterified products (ratio between monoesters, diesters, triesters, etc.) or the like. It is extremely difficult to determine all of these conditions. Also, the properties of the milk beverage cannot be defined only by HLB (hydrophilic-lipophilic balance) which has been generally used to define properties of surfactants. Therefore, in the present invention, the properties of the milk beverage are defined by a "cloud point" recently proposed as a novel determination method.

The "cloud point" generally represents a degree of such a phenomenon that when a hydrated nonionic surfactant is exposed to an elevated temperature, the nonionic surfactant is dehydrated and isolated from water. The cloud point is well used as a determination method in the field of polyoxyethylene-based surfactants. The cloud point is not only sharply influenced by structure and composition of polyglycerol fatty acid ester but also reflects the influences of fatty acid soap, so that the degree of hydrophilicity and the difference of composition can be accurately determined by measuring the cloud point. Further, the cloud point can be simply measured and, therefore, is used as the most typical property capable of representing the characteristics of polyglycerol fatty acid ester. Accordingly, the cloud point is a more useful index for determining the properties of polyglycerol fatty acid ester than the HLB. Since polyglycerol has many hydroxyl groups therein, the cloud point of polyglycerol fatty acid ester is generally high as compared to those of polyoxyethylene-based surfactants, and is frequently higher than the boiling point of water. Even in such cases, the cloud point of polyglycerol fatty acid ester can be readily measured by using an appropriate aqueous salt solution thereof (refer to Japanese Patent Application Laid-Open (KOKAI) No. 9-157386). In general, the higher the hydrophilicity, the higher the cloud point becomes. In addition, since an ester having a larger monoester content exhibits a higher hydrophilicity, the cloud point of such an ester also becomes higher than those having a lower monoester content even though esterification percentages of these esters are identical.

Generally, for measuring the cloud point of polyglycerol fatty acid ester, it is necessary to dissolve the ester in an aqueous solution containing sodium chloride or sodium sulfate in an amount of 1 to 30%. The cloud point-measuring conditions usually vary depending upon solubility of the specimen to be measured. A specific measuring method used in the present invention is explained below. First, the polyglycerol fatty acid ester is dispersed in a 20 wt % sodium chloride aqueous solution such that the ester is present therein in an amount of 1% by weight, and then heated while stirring to form a uniform aqueous solution. The thus obtained uniform aqueous solution of polyglycerol fatty acid ester is shaken and stirred, and then allowed to stand. This procedure is repeated at intervals of 2 to 5° C. while increasing the temperature of the aqueous solution within an optional temperature range between 0° C. and 100° C. Then, the temperature at which the polyglycerol fatty acid ester is separated in the form of oil or gel and the aqueous solution becomes heterogeneous, is measured. The temperature at which the aqueous solution reaches such a heterogeneous state, is called "cloud point". The measuring temperature of less than 0° C., i.e., less than the melting point of ice, or more than 100° C., i.e., more than the boiling point of water, is disadvantageous, because it becomes difficult to accurately observe the condition of the aqueous solution and measure the cloud point thereof.

The cloud point of the polyglycerol fatty acid ester used in the present invention is not less than 90° C. When the cloud point of the polyglycerol fatty acid ester is less than 90° C., the effect of the present invention cannot be sufficiently exhibited. Meanwhile, as conventional polyglycerol fatty acid esters having a high cloud point, there are known commercially available products such as hydrophilic decaglycerol monostearate (MSW-750, produced by Sakamoto Yakuhin Kogyo Co., Ltd.). However, the cloud point of the decaglycerol monostearate is about 82° C. at most. Therefore, even if the decaglycerol monostearate is used in milk beverages, it is impossible to completely prevent the separation of oil components (oil-off) when preserved for a long period of time under high-temperature conditions, so that the decaglycerol monostearate cannot exhibit a sufficient emulsifying function as the aim of the present invention. On the contrary, since the polyglycerol fatty acid ester used in the present invention has a cloud point of not less than 90° C., the milk beverage maintains a good emulsion stability even when being subjected to UHT sterilization.

The polyglycerol fatty acid ester is generally produced by reacting polyglycerol with fatty acid at a temperature of 180 to 260° C. in the presence of an alkali catalyst. As commercially available polyglycerol fatty acid esters, there are various products having different HLB values depending upon the ratio between fatty acid to polyglycerol charged. When the amount of fatty acid charged is larger than that of polyglycerol charged, the obtained ester products have a low hydrophilicity (low cloud point). On the contrary, when the amount of fatty acid charged is smaller than that of polyglycerol charged, the obtained ester products have a high hydrophilicity (high cloud point). Therefore, in the case where it is intended to produce ester products having a higher hydrophilicity, it is necessary to add the polyglycerol in an equimolar or excessive amount based on that of the fatty acid. However, even though the above charging ratio is used, when the esterification reaction is conducted in the presence of an alkali catalyst as usually, it is difficult to produce polyglycerol fatty acid ester containing a large amount of monoesters. Under such a condition, a mixture of unreacted polyglycerol and a relatively large amount of highly-substituted polyglycerol fatty acid esters containing di- or higher esters are rather produced.

The polyglycerol fatty acid ester having the specified cloud point according to the present invention can be usually produced by reducing the amount of alkali catalyst used, and using a two stage reaction whose second stage is conducted at a higher temperature. For instance, there may be used such a method of conducting the esterification reaction at a temperature of 180 to 260° C., and then continuing the reaction for 1 to 4 hours at a temperature higher by 10 to 50° C. than that used in the esterification reaction (refer to Japanese Patent Application Laid-Open (KOAKI) No. 7-145104(1995)). Thus, in order to produce the polyglycerol fatty acid ester having the specified cloud point, it is preferred to conduct the esterification reaction under such specific conditions. For instance, as is apparent from the production method described in Japanese Patent Application Laid-Open (KOAKI) No. 62-215345(1987), the obtained polyglycerol fatty acid esters have quite different cloud points from each other even though these esters are identical in hydroxyl value.

When polyglycerol as a raw material is used in an excessive amount, the obtained product contains a large amount of unreacted polyglycerol. The larger the amount of unreacted polyglycerol in the obtained product, the higher the hydrophilicity of the polyglycerol fatty acid ester becomes. However, in this case, since the substantial content of the polyglycerol fatty acid ester itself is comparatively reduced, the function as an emulsifier cannot be sufficiently exhibited. Accordingly, the amount of unreacted polyglycerol remaining in the polyglycerol fatty acid ester is preferably not more than 70% by weight, more preferably not more than 60% by weight.

As the ester-constituting fatty acid of the polyglycerol fatty acid ester, there may be exemplified saturated or unsaturated fatty acids having usually 14 to 22 carbon atoms. Among these fatty acids, those having a less number of carbon atoms are suitable. Specific examples of the fatty acids may include myristic acid, palmitic acid, stearic acid, behenic acid, oleic acid or the like. Among them, myristic acid, palmitic acid and stearic acid are preferred, and myristic acid is more preferred. The ester-constituting polyglycerol of the polyglycerol fatty acid ester has an average degree of polymerization of usually 2 to 20, preferably 4 to 12. The content of the polyglycerol fatty acid ester is usually 0.01 to 0.1% by weight, preferably 0.025 to 0.1% by weight based on the total weight of the milk beverage.

The milk beverage according to the present invention may contain various components other than the polyglycerol fatty acid ester. In particular, the use of a sucrose fatty acid ester in combination with the polyglycerol fatty acid ester is preferred since the stability of the milk beverage itself is further enhanced by adding the sucrose fatty acid ester thereto. As the sucrose fatty acid esters, there may be usually used those having a monoester content of not less than 50% by weight and containing palmitic acid or stearic acid in an amount of not less than 70% by weight based on the total weight of ester-constituting fatty acids thereof. It is preferred to use those having a monoester content of not less than 70% by weight and containing palmitic acid in an amount of not less than 80% based on the total amount of ester-constituting fatty acids thereof. The addition of the sucrose fatty acid ester is also preferred from the standpoint of bacteriostatic effect on the milk beverage. The content of the sucrose fatty acid ester is preferably 0.03 to 0.1% by weight based on the weight of the milk beverage. The weight ratio of the polyglycerol fatty acid ester to the sucrose fatty acid ester is preferably 1:1 to 7:3. As the other emulsifier components, there may be exemplified lecithin, lysolecithin, monoglyceride, organic acid monoglyceride, diglycerol fatty acid ester, sorbitan fatty acid ester or the like.

The milk beverage according to the present invention exhibits a high emulsion-heat resistance immediately after sterilization, and maintains a good emulsion stability for a long period of time even when being subjected to sterilization treatment, especially UHT sterilization. The retort sterilization is usually conducted at 121° C. for 20 to 40 minutes. Whereas, the UHT sterilization used for PET bottle-filled beverages or the like is such an ultrahigh-temperature sterilization that the sterilization temperature thereof is as high as 130 to 150° C., and the sterilization value (Fo) at 121° C. is equivalent to 10 to 50. The UHT sterilization may be conducted by known methods, e.g., directly-heating methods such as a steam injection method of directly injecting water vapor into the beverage or a steam infusion method of injecting the beverage into water vapor while heating, or indirectly-heating methods using surface heat exchangers of a plate-type or tube-type. For instance, the milk beverage according to the present invention may be sterilized using a plate-type pasteurizer.

In accordance with the present invention, there is provided a milk beverage containing milk fats and milk proteins and capable of maintaining a good emulsion stability for a long period of time even when being subjected to UHT sterilization.

EXAMPLES

The present invention will be described in more detail below by examples, but these examples are not intended to limit the scope of the present invention.

Examples 1 to 3 and Comparative Example 1

40 g of roasted coffee beans were extracted with 400 g of desalted water heated to 95° C., thereby obtaining a coffee extract solution. 313 g of the thus obtained coffee extract solution was mixed with 375 g of milk and 84 g of granulated sugar and further with an emulsifier as shown in Table 1. The emulsifier was used in an amount of 0.1% by weight based on the total weight of the resultant mixture. Then, desalted water was added to the mixture to obtain an emulsion having a total weight of 1,500 g. After sodium bicarbonate was added to the emulsion to adjusting the pH thereof to 6.8, the emulsion was intimately mixed and homogenized at a temperature of 60 to 70° C. under a pressure of 150 kg/50 kg·cm$^{-1}$ using a high-pressure homogenizer. Thereafter, the obtained emulsion was sterilized at 137° C. for 60 seconds (hold time for sterilization) using a plate-type UHT pasteurizer. 30 g of the thus obtained emulsion was sampled into a test tube under a sterile condition and cooled therein, thereby obtaining a milk coffee. The obtained milk coffee was preserved at 40° C. for 2 weeks. Thereafter, the cream-off amount of the milk coffee was measured using TurbiScan MA2000 (manufactured by Formal Action Co., Ltd.). The results are shown in Table 1.

<Measurement of cream-off amount using TurbiScan MA2000>

The sample within the test tube was scanned with light emitted from a light source at predetermined time intervals in the vertical direction thereof. The intensity of a back scattering light from the sample was detected to obtain a percentage of change in the intensity of back scattering light on the basis of the measuring time. The cream-off condition of the sample was recognized from the obtained changing percentage, and the cream-off amount was determined from the value measured at an upper portion of the test tube. The larger the percentage (as positive value) of change in the intensity of back scattering light based on the measuring time, the larger the cream-off amount and the more deteriorated the emulsion stability was. In Table 1, the emulsion stability (creaming) was evaluated according to the following criteria:

⊚: Percentage of change in intensity of back scattering light for 400 minutes was less than 3%;

◯: Percentage of change in intensity of back scattering light for 400 minutes was not less than 3% to less than 4%;

Δ: Percentage of change in intensity of back scattering light for 400 minutes was not less than 4%.

TABLE 1

| Examples and Comparative Examples | Emulsifier Polyglycerol fatty acid ester | | |
|---|---|---|---|
| | Kind | Cloud point (° C.) | Content (% by weight) based on total emulsifiers |
| Example 1 | Decaglycerol stearic acid ester A[1] | 95 | 50 |
| Example 2 | Decaglycerol stearic acid ester A | 95 | 70 |
| Example 3 | Decaglycerol stearic acid ester A | 95 | 100 |
| Comparative Example 1 | Decaglycerol stearic acid ester B[2] | 82 | 100 |

| Examples and Comparative Examples | Emulsifier Sucrose fatty acid ester | | | Emulsion stability (after 2 weeks) |
|---|---|---|---|---|
| | Kind | HLB | Content (% by weight) based on total emulsifiers | |
| Example 1 | Sucrose palmitic acid ester[3] | 16 | 50 | ⊚ |
| Example 2 | Sucrose palmitic acid ester[3] | 16 | 30 | ◯ |
| Example 3 | — | — | 0 | ◯ |
| Comparative Example 1 | — | — | 0 | Δ |

(Notes)
[1])Decaglycerol stearic acid ester A: produced by Mitsubishi chemical Foods Co., Ltd. (tradename: RYOTO-POLYGLYESTER S-10D)
[2])Decaglycerol stearic acid ester B: produced by Sakamoto Yakuhin Kogyo Co., Ltd. (tradename: SY-GLYSTAR-MSW-750)
[3])Sucrose palmitic acid ester: produced by Mitsubishi Chemical Foods Co., Ltd. (tradename: RYOTO-SUGAR ESTER P-1670)

Example 4 and Comparative Examples 2 to 3

49.5 g of whole milk powder and 90 g of granulated sugar were mixed with a decaglycerol stearic acid ester as an emulsifier having a cloud point as shown in Table 2. The emulsifier was used in an amount of 0.05% by weight based on the total weight of the resultant mixture. The obtained mixture was dissolved in desalted water, and then mixed with a 1N lactic acid aqueous solution to adjust the pH thereof to 6.6, thereby obtaining an emulsion having a total weight of 1,500 g. The thus obtained emulsion was intimately mixed and homogenized at a temperature of 60 to 70° C. under a pressure of 150 kg/50 kg cm$^{-2}$ using a high-pressure homogenizer. Thereafter, the obtained emulsion was sterilized at 132° C. for 90 seconds (hold time for sterilization) using a plate-type UHT pasteurizer. 30 g of the thus obtained emulsion was sampled into a test tube under a sterile condition and then cooled therein, thereby obtaining a whole milk powder solution. With respect to the whole milk powder solution immediately after sterilization and the same solution after being preserved at 55° C. for 2 months, the median size (size having a frequency of appearance of 50% in total) of agglomerated particles therein was measured and the oil-off condition of the solution was visually observed, thereby evaluating the emulsion stability of the whole milk powder solution. Incidentally, the median size was measured using LA-500 (manufactured by HORIBA Co., Ltd.). The results are shown in Table 2.

In Table 2, the oil-off condition of the whole milk powder solution was evaluated according to the following criteria.
○: No oil-off;
Δ: Slight oil-off;
X: Agglomerates due to oil-off.

TABLE 2

| Examples and Comparative Examples | Polyglycerol fatty acid ester | |
|---|---|---|
| | Kind | Cloud point (° C.) |
| Example 4 | Decaglycerol stearic acid ester A | 95 |
| Comparative Example 2 | Decaglycerol stearic acid ester B | 82 |
| Comparative Example 3 | Decaglycerol stearic acid ester C[4)] | <50 |

| | Emulsion stability | | | |
|---|---|---|---|---|
| Examples | Median size (μm) | | Oil-off | |
| and Comparative Examples | Immediately after sterilization | After 2 months | Immediately after sterilization | After 2 months |
| Example 4 | 0.46 | 0.46 | ○ | ○ |
| Comparative Example 2 | 0.48 | 0.49 | ○ | Δ |
| Comparative Example 3 | 0.54 | 0.57[5)] | ○ | Δ |

(Note)
[4)]Decaglycerol stearic acid ester C: produced by Mitsubishi Chemical Foods Co., Ltd. (tradename: RYOTO-POLYGLYESTER S-28D)
[5)]The amount of large agglomerated particles in emulsion was increased, and separate two peaks were observed in particle size distribution curve.

Production Example 1

188 g (0.27 mol) of decaglycerol (average degree of polymerization: 9.15, average molecular weight: 695, hydroxyl value: 900) and 62 g (0.27 mol) of myristic acid (purity: 99%, average molecular weight: 228) were charged into a stirred reactor equipped with a heating jacket, and then mixed with 0.025 g (0.0025% by weight based on the weight of the raw materials) of a 25% sodium hydroxide solution. The mixture was heated to 240° C. and reacted for 3 hours under a nitrogen stream, and further reacted at 260° C. for 4 hours, thereby obtaining 234 g of decaglycerol myristic acid ester.

Production Example 2

The same procedure as defined in Production Example 1 was conducted except that 183 g (0.26 mol) of decaglycerol (average degree of polymerization: 9.15, average molecular weight: 695, hydroxyl value: 900) and 67 g (0.25 mol) of palmitic acid (purity: 96%, average molecular weight: 257) were used as the raw materials, thereby obtaining 229 g of decaglycerol palmitic acid ester.

Examples 5 to 8 and Comparative Example 4

100 g of tea leaves (timbra tea) were extracted with 1,000 g of desalted water heated to 80° C., thereby obtaining a tea extract solution. 250 g of the thus obtained tea extract solution was mixed with 500 g of milk and 150 g of sugar. In addition, 500 g of an aqueous solution prepared by dissolving 2.5 g of an emulsifier as shown in Table 3 in 497.5 g of desalted water, was added to the obtained mixture. Then, desalted water was further added to the mixture to obtain an emulsion having a total weight of 2,500 g. The obtained emulsion was intimately mixed and homogenized at a temperature of 60 to 70° C. under a pressure of 150 kg/50 kg cm$^{-2}$ using a high-pressure homogenizer. Thereafter, the obtained emulsion was sterilized at 137° C. for 60 seconds (hold time for sterilization) using a plate-type UHT pasteurizer. The thus obtained emulsion was filled in a 500 ml PET bottle under a sterile condition and cooled therein, thereby obtaining a milk tea. With respect to the obtained milk tea immediately after sterilization and that after being preserved at 40° C. for 2 months, the median size (size having a frequency of appearance of 50% in total) of agglomerated particles in the milk tea was measured. Also, with respect to the milk tea after being preserved at 40° C. for 2 months, the cream-off amount thereof was measured using TurbiScan MA2000 (manufactured by Formal Action Co., Ltd.). Further, the milk tea after being preserved at 40° C. for 2 weeks and that after being preserved at 40° C. for 2 months, both filled in the PET bottle, were visually observed to evaluate the cream re-dispersibility and oil-off thereof. The results are shown in Table 3.

Meanwhile, in Table 3, the cream-off amount, the cream re-dispersibility and the oil-off were evaluated according to the following criteria.

<Evaluation criteria of cream-off amount>
⊙: Percentage of change in intensity of back scattering light for 600 minutes was less than 3%;
○: Percentage of change in intensity of back scattering light for 600 minutes was not less than 3% to less than 4%;
Δ: Percentage of change in intensity of back scattering light for 600 minutes was not less than 4% to less than 5%;
X: Percentage of change in intensity of back scattering light for 600 minutes was not less than 5%.

<Evaluation criteria of cream re-dispersibility>
⊙: Dispersed only by slightly shaking;
○: Dispersed after shaking for a moment;
Δ: Cream was adhered onto walls and difficult to disperse;
X: Agglomerated cream masses were floated.

<Evaluation criteria of oil-off>
○: No oil-off;
Δ: Slight oil-off;
X: Much oil-off;
X X: Agglomerates due to oil-off.

TABLE 3

| Examples and Comparative Examples | Emulsifier Polyglycerol fatty acid ester | | |
|---|---|---|---|
| | Kind | Cloud point (° C.) | Content (% by weight) based on total emulsifiers |
| Example 5 | Decaglycerol stearic acid ester A | 95 | 100 |
| Example 6 | Decaglycerol stearic acid ester A | 95 | 55 |
| Example 7 | Decaglycerol palmitic acid ester[6] | ≧100 | 50 |
| Example 8 | Decaglycerol myristic acid ester[7] | ≧100 | 50 |
| Comparative Example 4 | Decaglycerol stearic acid ester C | <50 | 100 |

| Examples and Comparative Examples | Emulsifier Sucrose fatty acid ester | | |
|---|---|---|---|
| | Kind | HLB | Content (% by weight) based on total emulsifiers |
| Example 5 | — | — | 0 |
| Example 6 | Sucrose palmitic acid ester[3] | 16 | 45 |
| Example 7 | Sucrose palmitic acid ester[3] | 16 | 50 |
| Example 8 | Sucrose palmitic acid ester[3] | 16 | 50 |
| Comparative Example 4 | — | — | 0 |

| Examples and Comparative Examples | Immediately after sterilization Median size (μm) | After 2 weeks | |
|---|---|---|---|
| | | Cream re-dispersibility | Oil-off |
| Example 5 | 0.45 | ○ | ○ |
| Example 6 | 0.43 | ○ | ○ |
| Example 7 | 0.44 | ○ | ○ |
| Example 8 | 0.43 | ○ | ○ |
| Comparative Example 4 | 0.47 | Δ | ○ |

TABLE 3-continued

| Examples and Comparative Examples | After 2 months | | | |
|---|---|---|---|---|
| | Median size (μm) | Cream-off amount | Cream re-dispersibility | Oil-off |
| Example 5 | 0.46 | ○ | ○ | ○ |
| Example 6 | 0.44 | ○ | ○ | ○ |
| Example 7 | 0.45 | ○ | ○ | ○ |
| Example 8 | 0.45 | ◎ | ○ | ○ |
| Comparative Example 4 | 0.49 | x | x | Δ |

(Notes)
[6] Decaglycerol palmitic acid ester obtained in Production Example 2
[7] Decaglycerol myristic acid ester obtained in Production Example 1

What is claimed is:

1. A milk beverage comprising a sucrose fatty acid ester and a polyglycerol fatty acid ester having a cloud point of not less than 90° C. when measured at a concentration of 1% by weight in a 20% sodium chloride aqueous solution containing said ester, wherein the amount of polyglycerol fatty acid ester is 0.01 to 0.1% by weight and the weight ratio of said polyglycerol fatty acid ester to said sucrose fatty acid ester is 1:1 to 7:3.

2. A milk beverage according to claim 1, wherein an ester-constituting polyglycerol of said polyglycerol fatty acid ester has an average degree of polymerization of 4 to 12, and the amount of unreacted polyglycerol remaining in said polyglycerol fatty acid ester is not more than 70% by weight based on the weight of said polyglycerol fatty acid ester.

3. A milk beverage according to claim 1, wherein a ester-constituting fatty acid of said polyglycerol fatty acid ester is at least one fatty acid selected from the group consisting of saturated and unsaturated fatty acids having 14 to 22 carbon atoms.

4. A milk beverage according to claim 1, wherein the content of said polyglycerol fatty acid ester is 0.025 to 0.1% by weight based on the weight of said milk beverage.

5. A milk beverage according to claim 1, wherein said sucrose fatty acid ester contains not less than 50% by weight monoester, and an ester-constituting fatty acid of said sucrose fatty acid ester contains palmitic acid or stearic acid in an amount of not less than 70% by weight.

6. A milk beverage according to claim 1, wherein the content of sucrose fatty acid ester is 0.03 to 0.1% by weight based on the weight of said milk beverage.

7. A milk beverage according to claim 1, wherein said milk beverage is milk coffee or milk tea.

* * * * *